US008294986B2

(12) United States Patent
Kawasaki (10) Patent No.: US 8,294,986 B2
(45) Date of Patent: Oct. 23, 2012

(54) OBSERVATION DEVICE

(75) Inventor: Kenji Kawasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 642 days.

(21) Appl. No.: 12/506,592

(22) Filed: Jul. 21, 2009

(65) Prior Publication Data

US 2010/0020391 A1    Jan. 28, 2010

(30) Foreign Application Priority Data

Jul. 25, 2008  (JP) .................................. 2008-192204

(51) Int. Cl.
*G02B 23/00* (2006.01)
(52) U.S. Cl. ....................................................... 359/434
(58) Field of Classification Search .................. 359/362, 359/367, 368, 399, 423, 434
See application file for complete search history.

(56) References Cited

U.S. PATENT DOCUMENTS

| | | | | |
|---|---|---|---|---|
| 3,309,161 A * | 3/1967 | Boughton | ....................... | 359/375 |
| 3,437,398 A * | 4/1969 | Muller et al. | .................. | 359/381 |
| 3,565,507 A * | 2/1971 | Peck | ................................ | 59/374 |
| 5,121,251 A * | 6/1992 | Edwards | ....................... | 359/368 |
| 5,278,632 A * | 1/1994 | Shotwell | ....................... | 356/612 |
| 5,515,201 A * | 5/1996 | Omi | ................................ | 359/385 |
| 5,815,311 A * | 9/1998 | Ishikawa | ....................... | 359/381 |
| 5,930,034 A * | 7/1999 | Fukumoto | ..................... | 359/381 |
| 6,175,447 B1 * | 1/2001 | Koide et al. | .................... | 359/417 |
| 6,686,988 B1 * | 2/2004 | Sugawara | ........................ | 355/22 |
| 6,804,049 B2 | 10/2004 | Ogino et al. | | |
| 2004/0061042 A1 * | 4/2004 | Almogy et al. | ............ | 250/208.1 |
| 2005/0237486 A1 * | 10/2005 | Su et al. | ........................ | 351/206 |

FOREIGN PATENT DOCUMENTS

| | | | |
|---|---|---|---|
| GB | 2045453 | * | 10/1980 |
| JP | 05-232385 A | | 9/1993 |
| JP | 09-211334 A | | 8/1997 |
| JP | 2002-148526 A | | 5/2002 |

* cited by examiner

*Primary Examiner* — Frank Font
(74) *Attorney, Agent, or Firm* — Holtz, Holtz, Goodman & Chick, PC (57) ABSTRACT

The observation device includes a micro optical system and a macro optical system. The observation device is configured in such a way that the micro and macro optical systems share an image position and that the first pupil position of the micro optical system and the second pupil position of the macro optical system substantially coincide with one another.

16 Claims, 8 Drawing Sheets

OBSERVATION DEVICE

This application claims the benefit of Japanese Application No. 2008-192204, filed Jul. 25, 2008, the contents of which are incorporated by this reference.

BACKGROUND OF THE INVENTION

1. Field of the Invention

The present invention relates to an observation device, and more particularly to a technology for providing both a macro optical system and a micro optical system in the same device.

2. Description of the Related Art

Conventionally, switching of the magnification of an observation device, such as a microscope, has been performed by switching the objectives attached to a revolver. However, it is difficult to implement the switching of magnifications having an extremely large magnification difference using only this method, i.e., by only switching objectives by means of a revolver. This is because the large magnification difference leads to a large difference between the focal lengths of the objectives, and it is difficult to put in and take out optical systems that have a large difference between their focal lengths while maintaining their compatibility.

In the market of observation devices such as microscopes, meanwhile, a large magnification difference tends to be desired. For example, when an observation is performed using a glass-bottom dish, a well plate, and the like, both an extremely low magnification enabling an observation of the entirety of an observation object and a high magnification enabling a detailed observation of the cell and the like of an observation object are used. In addition, in order to observe the entirety of the glass-bottom dish and of the well plate at one time, a reduction magnification (i.e., lower than a 1-fold magnification) is usually needed.

Japanese Patent Application Publications No. H5-232385, No. H9-211334, and No. 2002-148526 disclose a configuration in which the microscope comprises both a micro optical, system achieving a high magnification and a macro optical system achieving an extremely low magnification.

In these disclosures, however, since a macro optical system having a long focal length and a micro optical system having a short focal length are simply combined, it is difficult to actually make such a configuration.

In addition, nothing is done to avoid the occurrence of an illumination irregularity in the macro optical system or the micro optical system, which may occur when they share an epi-illumination optical system.

SUMMARY OF THE INVENTION

The observation device according to an aspect of the present invention comprises a micro optical system and a macro optical system. The micro and macro optical systems share an image position. A first pupil position of the micro optical system and a second pupil position of the macro optical system substantially coincide with one another.

BRIEF DESCRIPTION OF THE DRAWINGS

The present invention will be more apparent from the following detailed description when the accompanying drawings are referenced.

DESCRIPTION OF THE PREFERRED EMBODIMENTS

First, the features common to the embodiments described in the following will be described.

In each of the embodiments of the present invention, in regard to the observation device with a micro optical system and a macro optical system sharing an image position, when the exit pupil position of the micro optical system is regarded as being a first pupil position and the exit pupil position of the macro optical system is regarded as being a second pupil position, the first and second pupil positions substantially coincide with each other. The first pupil position is a position of a pupil made by relaying a pupil position, contained in the micro optical system by means of a pupil relay optical system. In other words, the observation device is configured in such a way that the relayed pupil position of the micro optical system coincides with the direct pupil position of the macro optical system.

In order to heighten the magnification ratio of the micro optical system and the macro optical system, the difference has to be enlarged between the focal length of the micro optical system and that of the macro optical system. In this way, when the macro optical system and the micro optical system are simply combined, the lengths of the optical systems will be very different. In each of the embodiments, by making the relayed pupil position of the micro optical system coincide with the direct pupil position of the macro optical system, problems caused by the difference between the lengths of the optical systems are resolved.

In regard to a general objective of a microscope, an exit pupil position exists inside the objective; and it is impossible to make the pupil position of the micro optical, system and the pupil position of the macro optical system coincide with each other directly. In each of the embodiments, therefore, a pupil relay optical system is provided for the micro optical system.

In this way, a general objective for a microscope with its pupil position adequately designed can be combined with the pupil relay optical system so as to configure a micro optical system.

In this case, the macro optical system preferably has a three-group configuration in an area leading from an object to the pupil position such that it comprises a first macro optical system lens group that has a negative refracting power, a second macro optical system lens group that has a negative refracting power, and a third macro optical system lens group that has a positive refracting power.

The first and second macro optical system lens groups are preferably arranged in such a way that their concave surfaces face each other. This is because optical surfaces with their concave surfaces facing each other are preferable when field curvature is corrected. In each of the embodiments, field curvature is corrected by arranging the first and second macro optical system lens groups in such a way that their concave surfaces lace each other.

Since the last plane of the first macro optical system lens group is a concave surface on the image side, it is preferable that the first macro optical system lens group have a negative refracting power, the second macro optical system lens group have a negative refracting power, and the third macro optical system lens group have a positive refracting power.

It is preferable that the pupil relay optical system have a two-group configuration such that it comprises a first pupil relay optical system lens group that has a positive refracting power and a second pupil relay optical system lens group that has a positive refracting power, placed in this order starting from an object. In addition, a primary image (intermediate image) is preferably formed between the first pupil relay optical system lens group and the second pupil relay optical system lens group. This configuration is so-called Keplerian relay optics.

An intermediate image of the micro optical system is not observed using the observation device of each of the embodiments. Therefore, imaging performance of the intermediate image is not important. Thus, the pupil relay optical system in each of the embodiments is configured to have a two-group configuration and to have the minimal necessary number of lenses.

Here, it is preferable that the third macro optical system lens group and the second pupil relay optical system lens group be lens groups have the same design. In the embodiments of the present invention, both the third lens group of the macro optical system and the second lens group of the pupil, relay optical system have positive refracting power. Therefore, by adequately distributing the refracting power in the observation device, the third lens group of the macro optical system and the second lens group of the pupil relay optical system can be commonly designed. In this way, common members can be used to reduce management costs and manufacturing costs.

More preferably, the third macro optical system lens group is the second pupil relay optical system lens group. In the embodiments of the present invention, the third macro optical system lens group and the second pupil relay optical system lens group are not only commonly designed but also they are placed on a common light path and shared by the macro and micro optical systems.

In order to places the third macro optical system lens group and the second pupil relay optical system lens group on a common light path, a first light path dividing element for dividing the light path of the macro optical system from the light path of the micro optical, system is preferably placed between the first pupil relay optical system lens group and the second pupil relay optical system, lens group. The light path dividing element of each of the embodiments may be a half mirror or may be a normal mirror. In each of the embodiments, since the macro and micro optical systems share an image position, the images formed by the two optical systems cannot be simultaneously observed. Therefore, a normal mirror may be used as the first light path dividing element, and it may be put in or taken out of an observation light path when observation light paths are switched.

In each of the embodiments, a tube lens is placed between the first light path dividing element and the image position.

The observation device of each of the embodiments is preferably configured to comprise an image sensor at its image position. In each of the embodiments, the macro and micro optical systems share an image position. At this image position, the macro optical system forms a primary image and the micro optical system forms a secondary image. In other words, images that are inversions of each other are observed using the micro and macro optical systems. In each of the embodiments, therefore, if is preferable that an image sensor be provided at an image position and that an observation be performed using an electronic method. In an electronic observation method, an observation image is easily inverted.

It is preferable that the focal plane of the micro optical system and the local plane of the macro optical system be placed on the same plane and that a specimen be moved between the micro and macro optical systems by means of a rotary stage.

As described above, in the embodiments of the present invention, the observation images of the macro and micro optical systems are inverses of each other. Using a rotary stage that has a rotation axis in the vicinity of the center of the specimen position of the macro optical system and the specimen position of the micro optical system, the left, right, top, and bottom of a specimen are inverted when the specimen is moved between the micro and macro optical systems. Therefore, such a rotary stage is suitable for the switching of micro and macro optical systems having images that are inverses of each other.

With reference to the drawings, each of the embodiments will be described in the following.

Embodiment 1

Figure 1:
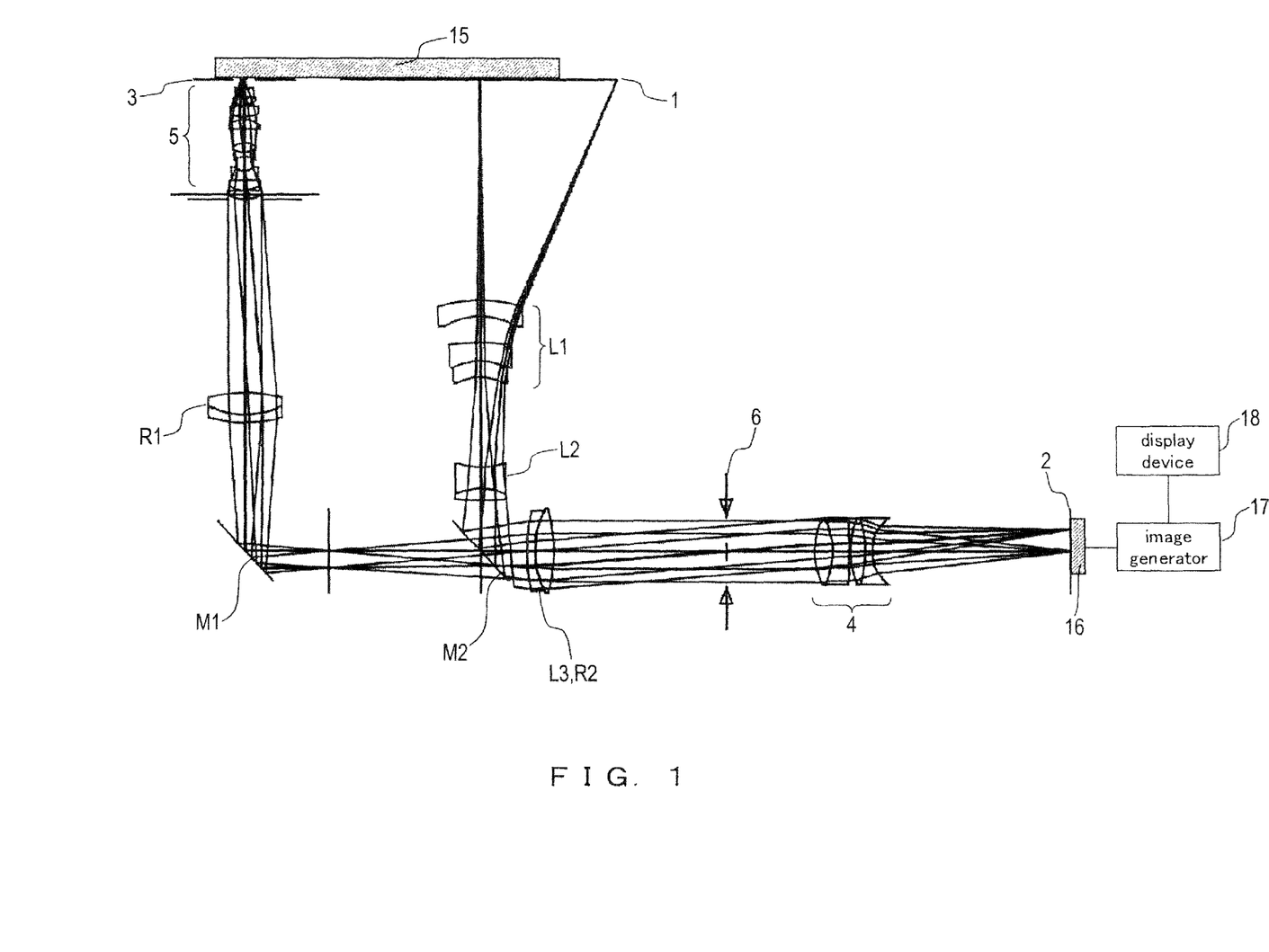
FIG. 1 is a diagram exemplifying the configuration of an observation device that includes the macro optical system and the micro optical system according to embodiment 1.

FIG. 1 is a diagram exemplifying the configuration of an observation device that includes a macro optical system and a micro optical system according to the present embodiment. FIG. 1 also illustrates a light path leading from a specimen position 1 of the macro optical system to an image position 2 and a light path leading from a specimen position 3 of the micro optical system to the image position 2.

The observation device illustrated in FIG. 1 comprises a macro optical system and a micro optical system.

The macro optical system is configured in such a way that the portion leading from the specimen position 1 to a pupil position 6 includes three groups. The macro optical system comprises a first macro optical system lens group L1 that has a negative refracting power, a second macro optical system lens group L2 that has a negative refracting power, a third macro optical system lens group L3 that has a positive refracting power, and a tube lens 4, placed in this order starting from the specimen position 1. The light from the specimen position 1 is incident on the tube lens 4 via the three groups arranged from the specimen position 1 to the pupil position 6, and is focused on an image plane 2 by the tube lens 4, and the specimen is imaged. In this case, the pupil position 6 is a direct pupil position of the macro optical system.

The micro optical system comprises an objective 5, a pupil relay optical system that relays the exit pupil position of the objective, and the tube lens 4. Here, a general objective for a microscope is used as the objective 5. The pupil relay optical system comprises a first pupil relay optical system lens group R1 that has a positive refracting power and a second pupil relay optical system lens group R2 that has a positive refracting power. The pupil relay optical system is configured in such a way that an intermediate image is formed between the first pupil relay optical system lens group R1 and the second pupil relay optical system lens group R2. In other words, a secondary image of the micro optical system will be formed at the image position 2 by the tube lens 4. The pupil position 6 is a relayed pupil position of the micro optical system.

As illustrated in FIG. 1, in the observation device according to the present embodiment, the macro and micro optical systems not only share the image position 2 but also share the pupil position 6 that is the direct pupil position of the macro optical system and that is made by relaying a pupil position of the micro optical system. In this way, a macro optical system having a long focal length and a micro optical system having a short focal length can be efficiently placed in the same observation device.

The tube lens 4 placed between the pupil position 6 and the image position 2 is also shared by the macro and micro optical systems.

In addition, the third macro optical system lens group L3 and the second pupil relay optical system lens group R2 are also shared. Since both the third macro optical system lens group L3 and the second pupil relay optical system lens group R2 have positive refracting power, they can be shared. In addition, a light path dividing element M2 (first light path dividing element) dividing the light path of the macro optical system from the light path of the micro optical system is placed between the first pupil relay optical system lens group R1 and the second pupil relay optical system lens group R2. In this way, the light path leading from the light path dividing element M2 to the image position 2 is shared by the macro and micro optical systems. Therefore, the third macro optical system lens group L3 (second pupil relay optical system lens group R2) is placed on a shared light path such that it can be shared by the macro and micro optical systems.

As illustrated in FIG. 1, the observation device of the present embodiment is configured in such a way that the specimen position 1 of the macro optical system and the specimen position 3 of the micro optical system are on the same plane. In order to make such a configuration, a mirror M1 adequately reflecting the light path and the light path dividing element M2 are placed in the observation device. The light path dividing element M2 also serves to divide the light path of the micro optical system from the light path of the macro optical system. Therefore, a half mirror, a dichroic mirror, or a removable mirror is used as the light path dividing element M2.

The image position 2 of the present embodiment is shared by the micro and macro optical systems. In regard to the macro optical system, this image position 2 is an image position for a primary image. In regard to the micro optical system, by contrast, it is an image position for a secondary image. In other words, an image of the macro optical system is an inverted image, and an image of the micro optical system is an erected image. Therefore, it is preferable that the configuration of the present embodiment be made such that an image sensor 16 such as a CCD is placed at the image position 2 as illustrated in FIG. 1, and this configuration is preferably used for an electronic observation method in which an image of a specimen which an image generator 17 generates from a signal output from the image sensor 16 is shown on a display device 18.

The specimen position 1 of the macro optical system and the specimen position 3 of the micro optical system are configured on the same plane. Therefore, it is also possible to make a configuration in which the specimen position 1 of the macro optical system and the specimen position 3 of the micro optical system are switched by a rotary stage 15. The rotary stage 15 comprises both a rolling mechanism and a transferring mechanism for transferring in direction parallel to the stage surface.

Figure 2A:
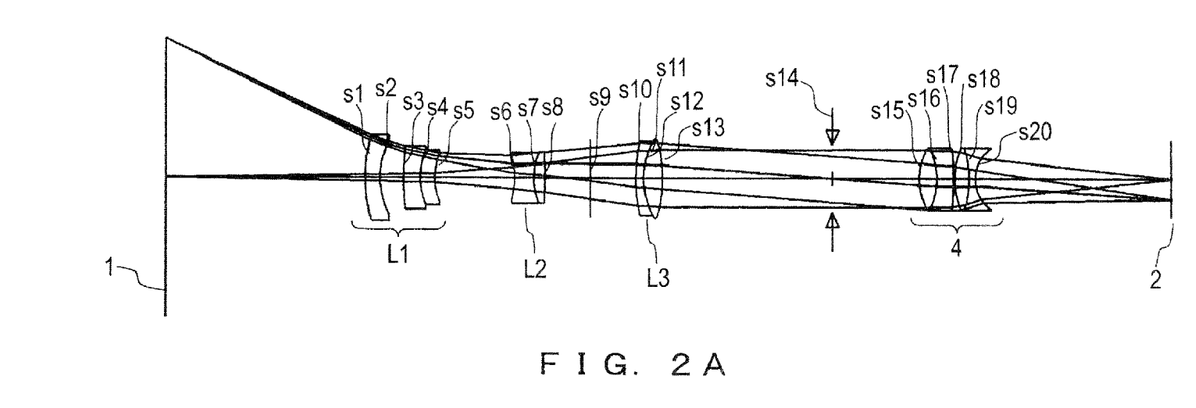
FIG. 2A is a diagram showing the surface numbers of the macro optical system and the light paths of light beams of embodiment 1.
Figure 2B:
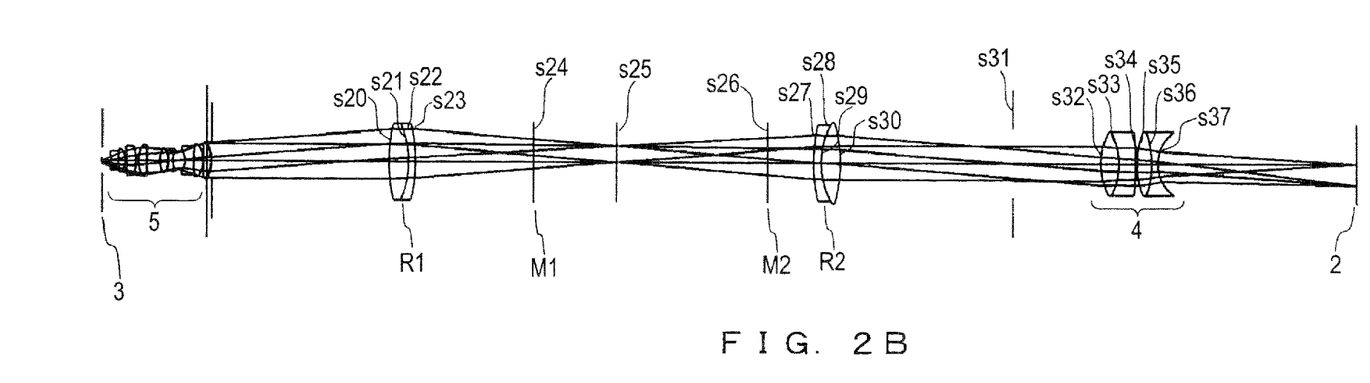
FIG. 2B is a diagram showing the surface numbers of the micro optical system and the light paths of light beams of embodiment 1.

The following is the disclosure of the lens data of the optical systems used in embodiment 1. FIG. 2A is a diagram showing the surface numbers of the macro optical system and the light paths of light beams of the present embodiment. FIG. 2B is a diagram showing the surface numbers of the micro optical system and the light paths of light beams of the present embodiment. Since it is desired that the objective 5 be accordingly exchanged and used in the micro optical system, its surface number is omitted in FIG. 2B. FIG. 2B illustrates a light path when using an objective with a 10-fold magnification as the objective 5.

Tables 1 and 2 shown in the following indicate lens data of the macro optical system of embodiment 1. Table 1 indicates lens data of the optical system leading from the specimen position 1 of the macro optical system to the image position 2. Table 2 indicates the focal lengths of the lens groups L1, L2 and L3 of the macro optical system and the working distance of the macro optical system.

TABLE 1

| | Code | Surface number | Radius of curvature | Surface separation | Refractive index | Abbe number |
|---|---|---|---|---|---|---|
| Specimen position | 1 | OBJ | INF | 86.8827 | AIR | |
| Macro optical system | L1 | s1 | 65.959 | 6.3 | 1.741 | 52.64 |
| | | 2 | 31.581 | 10.3855 | AIR | |
| | | 3 | 108.3 | 7.15 | 1.741 | 52.64 |
| | | 4 | 28.345 | 6.25 | 1.6134 | 44.27 |
| | | 5 | 25 | 34.9317 | AIR | |
| | L2 | 6 | −31.602 | 8.4 | 1.6779 | 55.34 |
| | | 7 | 27.5 | 4.7 | 1.738 | 32.26 |
| | | 8 | −140.722 | 20 | AIR | |
| Mirror | M2 | 9 | INF | 20 | AIR | |
| Macro optical system | L3 | 10 | 69.197 | 3.35 | 1.6134 | 44.27 |
| | | 11 | 33.076 | 0.0201 | AIR | |
| | | 12 | 33.222 | 8.2 | 1.43875 | 94.93 |
| | | 13 | −56.329 | 73.8674 | AIR | |
| Exit pupil position | 6 | 14 | INF | 38.0765 | AIR | |
| Tube lens | 4 | 15 | 28.284 | 7.72 | 1.43875 | 94.93 |
| | | 16 | −28.284 | 7.25 | 1.8061 | 40.92 |
| | | 17 | −120.66 | 0.492 | AIR | |
| | | 18 | 32.615 | 6.3 | 1.834 | 37.16 |
| | | 19 | −41.056 | 2.81 | 1.6134 | 44.27 |
| | | 20 | 15.653 | 85.7256 | AIR | |
| Image position | 2 | IMG | INF | | | |

TABLE 2

| | Focal length of lens group | Focal length of lens group | Focal length of lens group | Working distance |
|---|---|---|---|---|
| L1 | −27.418 | −15.22 | 1182.969 | 86.883 |
| L2 | −77.199 | | | |
| L3 | 89.985 | — | | |

The lens data above indicates that in the macro optical system of embodiment 1, the first macro optical system lens group L1 has a negative refracting power; the second macro optical system lens group L2 has a negative refracting power; and the third macro optical system lens group L3 has a positive refracting power.

As shown or illustrated in the lens data above and the light path in FIG. 2A, the macro optical system of embodiment 1 is a non-telecentric optical system. As a result, the first macro optical system lens group L1 of the present embodiment has a small lens aperture, and further it can have a long working distance.

Table 3 shown in the following indicates the lens data of the micro optical system of embodiment 1. The objective mounting position in Table 3 is an abutting surface between an objective and the body of a microscope when the objective is attached to the body of the microscope. The seventeenth surface (surface number S17) to the nineteenth surface (surface number s19) in Table 3 are virtual surfaces, each of which is used to work out a design.

TABLE 3

| | Code | Surface number | Radius of curvature | Surface separation | Refractive index | Abbe number |
|---|---|---|---|---|---|---|
| Specimen position | 3 | OBJ | INF | 0.17 | 1.521 | 56.02 |
| Objective 10X | 5 | s1 | INF | 3.9486 | AIR | |
| | | 2 | −5.9965 | 2.982 | 1.673 | 38.15 |
| | | 3 | 71.8587 | 3.0905 | 1.497 | 81.54 |
| | | 4 | −7.1299 | 0.2125 | AIR | |
| | | 5 | 177.085 | 4.1851 | 1.56907 | 71.3 |
| | | 6 | −18.9259 | 1.11 | AIR | |
| | | 7 | 11.1707 | 3.6235 | 1.43875 | 94.93 |
| | | 8 | INF | 5.4744 | AIR | |
| | | 9 | 9.3475 | 3.6935 | 1.43875 | 94.93 |
| | | 10 | −10.9268 | 1.8214 | 1.55836 | 54.01 |
| | | 11 | 7.4855 | 5.511 | AIR | |
| | | 12 | −5.4188 | 3.5673 | 1.51633 | 64.14 |
| | | 13 | 116.2141 | 4.0903 | 1.43875 | 94.93 |
| | | 14 | −10.794 | 0.13 | AIR | |
| | | 15 | INF | 3.238 | 1.497 | 81.54 |
| | | 16 | −17.1112 | −1.788 | AIR | |
| | | 17 | INF | 2 | AIR | |
| | | 18 | INF | −2 | AIR | |
| Objective mounting position | | 19 | INF | 78 | AIR | |
| Pupil relay optical system | R1 | 20 | 67.434 | 8.5 | 1.48749 | 70.23 |
| | | 21 | −36.268 | 0.052 | AIR | |
| | | 22 | −35.806 | 3 | 1.738 | 32.26 |
| | | 23 | −65.776 | 50.388 | AIR | |
| Mirror | M1 | 24 | INF | 35.7163 | AIR | |
| Position of intermediate image | | 25 | INF | 64.774 | AIR | |
| Mirror | M2 | 26 | INF | 20 | AIR | |
| Pupil relay optical system | R2 | 27 | 69.197 | 3.35 | 1.6134 | 44.27 |
| | | 28 | 33.076 | 0.0201 | AIR | |
| | | 29 | 33.222 | 8.2 | 1.43875 | 94.93 |
| | | 30 | −56.329 | 73.8674 | AIR | |
| Pupil-conjugate position | 6 | 31 | INF | 38.0765 | AIR | |
| Tube lens | 4 | 32 | 28.284 | 7.72 | 1.43875 | 94.93 |
| | | 33 | −28.284 | 7.25 | 1.8061 | 40.92 |
| | | 34 | −120.66 | 0.492 | AIR | |
| | | 35 | 32.615 | 6.3 | 1.834 | 37.16 |
| | | 36 | −41.056 | 2.81 | 1.6134 | 44.27 |
| | | 37 | 15.653 | 85.7256 | AIR | |
| Image position | 2 | IMG | INF | | | |

Embodiment 2

Figure 3:
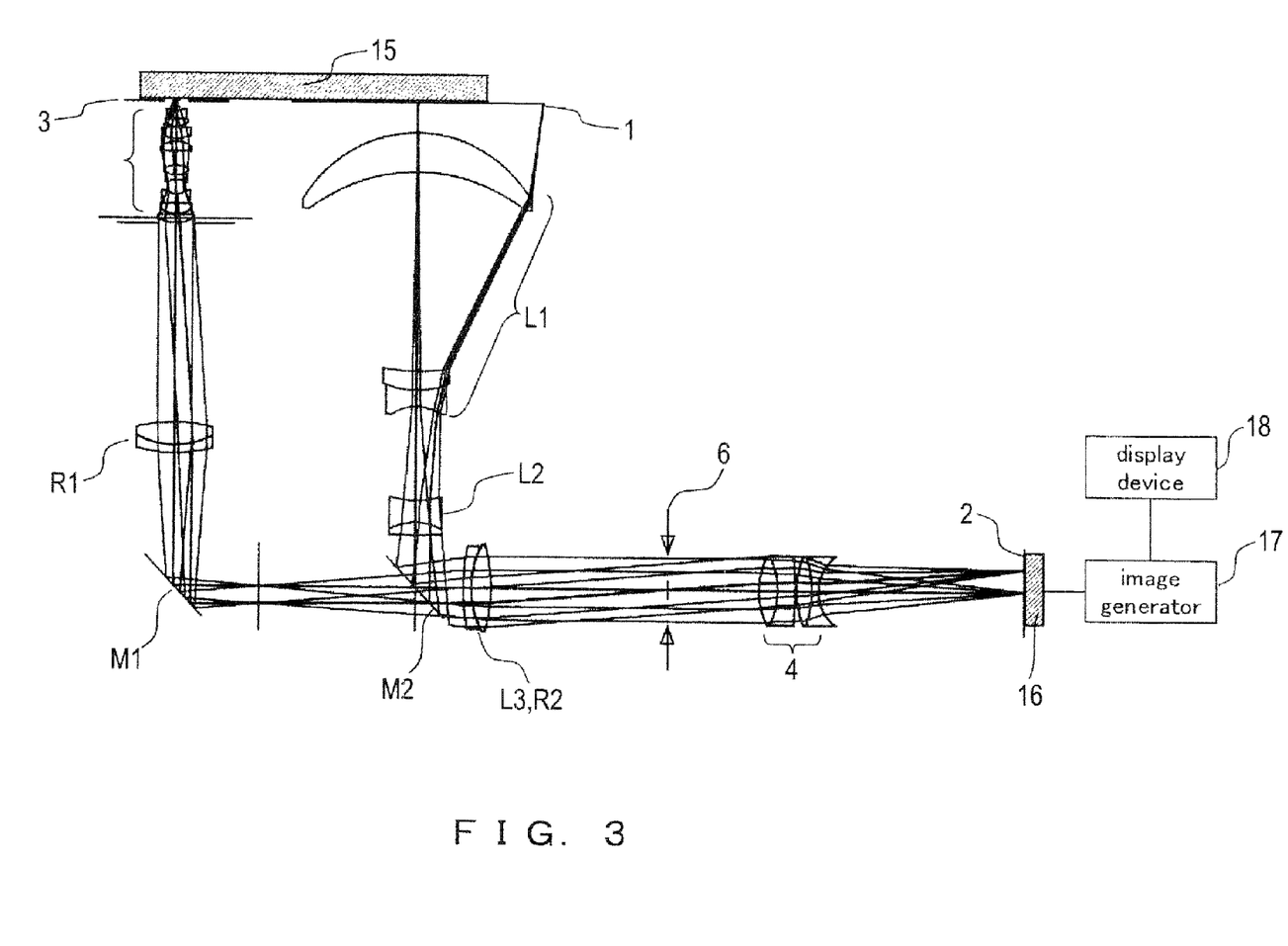
FIG. 3 is a diagram exemplifying the configuration of the observation device including the macro optical system and the micro optical system according to embodiment 2.

FIG. 3 is a diagram exemplifying the configuration of an observation device that includes a macro optical system and a micro optical system according to the present embodiment. FIG. 3 also illustrates a light path leading from a specimen position 1 of the macro optical system to an image position 2 and a light path leading from a specimen position 3 of the micro optical system to the image position 2. The observation device illustrated in FIG. 3 also comprises a macro optical system and a micro optical system.

In terms of configurations, many of the features of the present embodiment are common to those of embodiment 1. Therefore, by giving like codes in FIG. 1 to like elements, their descriptions are omitted.

Figure 4A:
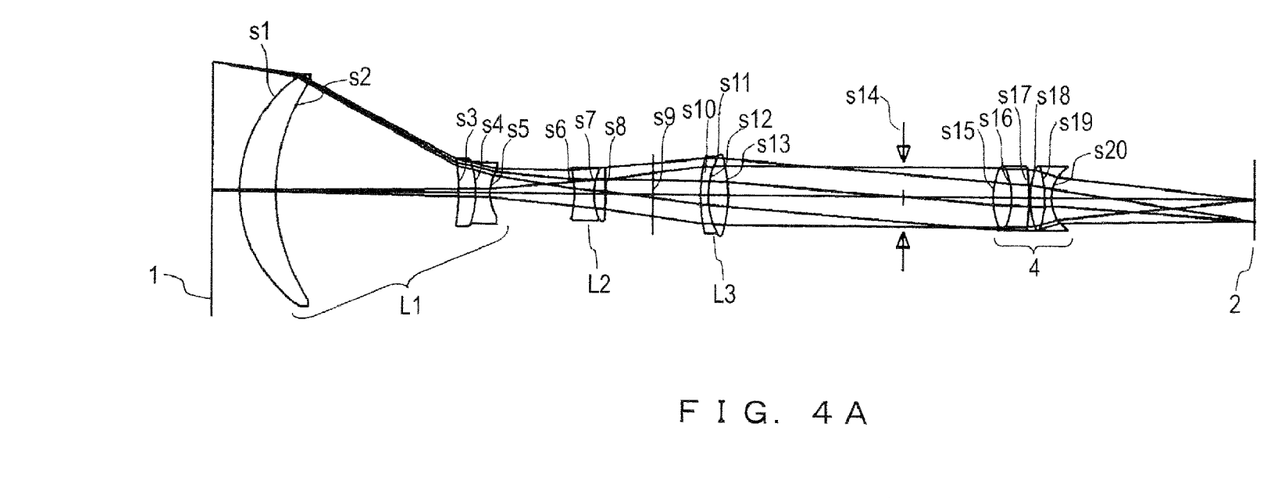
FIG. 4A is a diagram showing the surface numbers of the macro optical system and the light paths of light beams of embodiment 2.
Figure 4B:
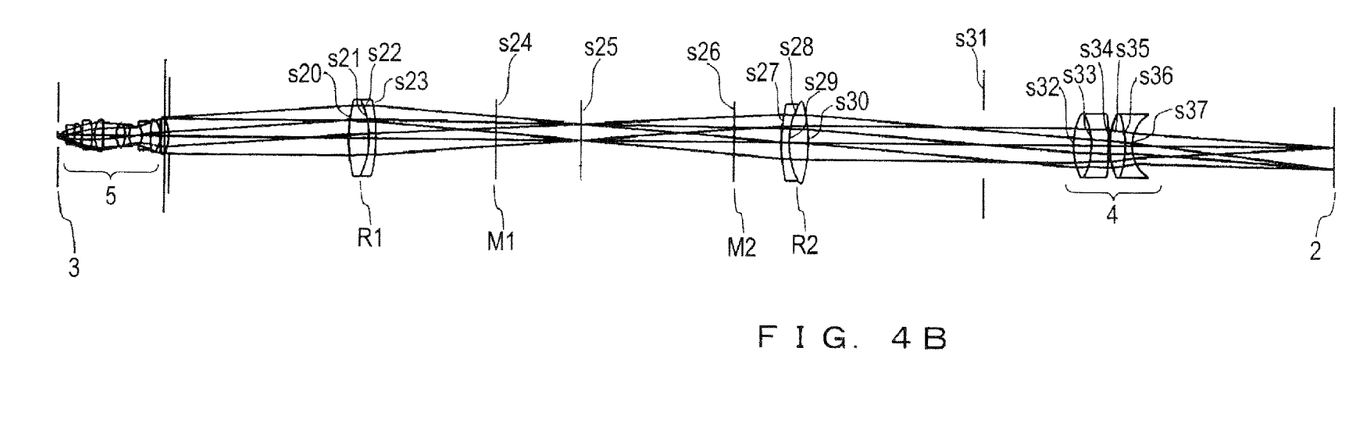
FIG. 4B is a diagram showing the surface numbers of the micro optical system and the light paths of light beams of embodiment 2.

The lens data of the optical systems used in embodiment 2 will be disclosed in the following. FIG. 4A is a diagram showing the surface numbers of the macro optical system and the light paths of light beams of the present embodiment. FIG. 4B is a diagram showing the surface numbers of the micro optical system and the light paths of light beams of the present embodiment. In regard to the micro optical system, since it is desired that the objective 5 be accordingly exchanged and used, codes are omitted in FIG. 4B. FIG. 4B illustrates light paths when using an objective with a 10-fold magnification as the objective 5.

Tables 4 and 5 shown in the following indicate lens data of the macro optical system of embodiment 2. Table 4 indicates lens data of the optical system leading from the specimen position 1 of the macro optical system to the image position 2. Table 5 indicates the focal lengths of the lens groups L1, L2 and L3 of the macro optical system and the working distance of the macro optical system.

TABLE 4

| | Code | Surface number | Radius of curvature | Surface separation | Refractive index | Abbe number |
|---|---|---|---|---|---|---|
| Specimen position | 1 | OBJ | INF | 11.581 | AIR | |
| Macro optical system | L1 | s1 | 57 | 15 | 1.741 | 52.64 |
| | | 2 | 78.246 | 76.5026 | AIR | |
| | | 3 | −85 | 7.15 | 1.741 | 52.64 |
| | | 4 | −39.041 | 6.25 | 1.6134 | 44.27 |
| | | 5 | 18.588 | 35.4163 | AIR | |
| | L2 | 6 | −40.574 | 8.4 | 1.6779 | 55.34 |
| | | 7 | 23.99 | 4.7 | 1.738 | 32.26 |
| | | 8 | −279.75 | 20 | AIR | |
| Mirror | M2 | 9 | INF | 20 | AIR | |
| Macro optical system | L3 | 10 | 69.197 | 3.35 | 1.6134 | 44.27 |
| | | 11 | 33.076 | 0.0201 | AIR | |
| | | 12 | 33.222 | 8.2 | 1.43875 | 94.93 |
| | | 13 | −56.329 | 73.8674 | AIR | |
| Exit pupil position | 6 | 14 | INF | 38.0765 | AIR | |
| Tube lens | 4 | 15 | 28.284 | 7.72 | 1.43875 | 94.93 |
| | | 16 | −28.284 | 7.25 | 1.8061 | 40.92 |
| | | 17 | −120.66 | 0.492 | AIR | |
| | | 18 | 32.615 | 6.3 | 1.834 | 37.16 |
| | | 19 | −41.056 | 2.81 | 1.6134 | 44.27 |
| | | 20 | 15.653 | 85.7256 | AIR | |
| Image position | 2 | IMG | INF | | | |

TABLE 5

| | Focal length of lens group | Focal length of lens group | Focal length of lens group | Working distance |
|---|---|---|---|---|
| L1 | −63.1041 | −36.528 | 882.196 | 11.581 |
| L2 | −90.6254 | | | |
| L3 | 89.985 | — | | |

The lens data above indicates that in the macro optical system of embodiment 2, the first, macro optical system lens group L1 has a negative refracting power; the second macro optical system lens group L2 has a negative refracting power; and the third macro optical system lens group L3 has a positive refracting power.

As shown or illustrated in the lens data above and the light path in FIG. 4A, the macro optical system of embodiment 2 is also a non-telecentric optical system. In comparison with embodiment 1, however, it is similar to a telecentric optical system.

Table 6 shown in the following indicates the lens data of the micro optical system of embodiment 2. The objective mounting position in Table 6 is an abutting surface between an objective and the body of a microscope when the objective is attached to the body of the microscope. The seventeenth surface (surface number s17) to the nineteenth surface (surface number s19) in Table 6 are virtual surfaces, each of which is used to work out a design.

TABLE 6

| | Code | Surface number | Radius of curvature | Surface separation | Refractive index | Abbe number |
|---|---|---|---|---|---|---|
| Specimen position | 3 | OBJ | INF | 0.17 | 1.521 | 56.02 |
| Objective 10X | 5 | s1 | INF | 3.9486 | AIR | |
| | | 2 | −5.9965 | 2.982 | 1.673 | 38.15 |
| | | 3 | 71.8587 | 3.0905 | 1.497 | 81.54 |
| | | 4 | −7.1299 | 0.2125 | AIR | |
| | | 5 | 177.085 | 4.1851 | 1.56907 | 71.3 |
| | | 6 | −18.9259 | 1.11 | AIR | |
| | | 7 | 11.1707 | 3.6235 | 1.43875 | 94.93 |
| | | 8 | INF | 5.4744 | AIR | |
| | | 9 | 9.3475 | 3.6935 | 1.43875 | 94.93 |
| | | 10 | −10.9268 | 1.8214 | 1.55836 | 54.01 |
| | | 11 | 7.4855 | 5.511 | AIR | |
| | | 12 | −5.4188 | 3.5673 | 1.51633 | 64.14 |
| | | 13 | 116.2141 | 4.0903 | 1.43875 | 94.93 |
| | | 14 | −10.794 | 0.13 | AIR | |
| | | 15 | INF | 3.238 | 1.497 | 81.54 |
| | | 16 | −17.1112 | −1.788 | AIR | |
| | | 17 | INF | 2 | AIR | |
| | | 18 | INF | −2 | AIR | |
| Objective mounting position | | 19 | INF | 78 | AIR | |
| Pupil relay optical system | R1 | 20 | 67.434 | 8.5 | 1.48749 | 70.23 |
| | | 21 | −36.268 | 0.052 | AIR | |
| | | 22 | −35.806 | 3 | 1.738 | 32.26 |
| | | 23 | −65.776 | 50.388 | AIR | |
| Mirror | M1 | 24 | INF | 35.7163 | AIR | |
| Intermediate image | | 25 | INF | 64.774 | AIR | |
| Mirror | M2 | 26 | INF | 20 | AIR | |
| Pupil relay optical system | R2 | 27 | 69.197 | 3.35 | 1.6134 | 44.27 |
| | | 28 | 33.076 | 0.0201 | AIR | |
| | | 29 | 33.222 | 8.2 | 1.43875 | 94.93 |
| | | 30 | −56.329 | 73.8674 | AIR | |
| Pupil-conjugate position | | 31 | INF | 38.0765 | AIR | |
| Tube lens | 4 | 32 | 28.284 | 7.72 | 1.43875 | 94.93 |
| | | 33 | −28.284 | 7.25 | 1.8061 | 40.92 |

TABLE 6-continued

| | Code | Surface number | Radius of curvature | Surface separation | Refractive index | Abbe number |
|---|---|---|---|---|---|---|
| | | 34 | −120.66 | 0.492 | AIR | |
| | | 35 | 32.615 | 6.3 | 1.834 | 37.16 |
| | | 36 | −41.056 | 2.81 | 1.6134 | 44.27 |
| | | 37 | 15.653 | 85.7256 | AIR | |
| Image position | 2 | IMG | INF | | | |

Embodiment 3

Figure 5:
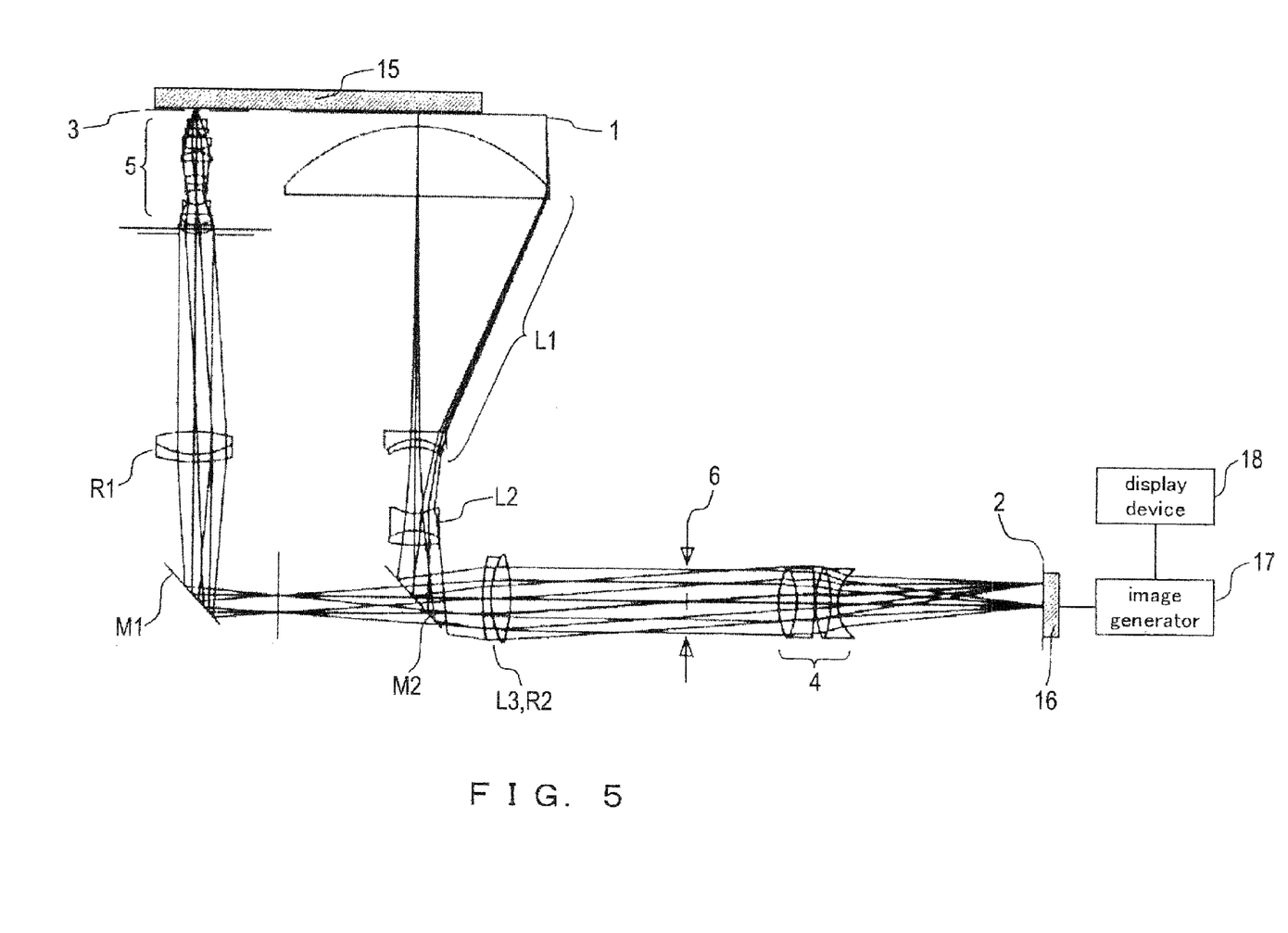
FIG. 5 is a diagram exemplifying the configuration of the observation device including the macro optical system, and the micro optical system according to embodiment 3.

FIG. 5 is a diagram exemplifying the configuration of an observation device that includes a macro optical system and a micro optical system according to the present embodiment. FIG. 5 also illustrates a light path leading from a specimen position 1 of the macro optical system to an image position 2 and a light path leading from a specimen position 3 of the micro optical system to the image position 2. The observation device illustrated in FIG. 5 also comprises a macro optical system and a micro optical system.

In terms of configurations, many of the features of the present embodiment are common to those of embodiment 1 mentioned above. Therefore, by giving like codes in FIG. 1 to like elements, their descriptions are omitted.

Figure 6A:
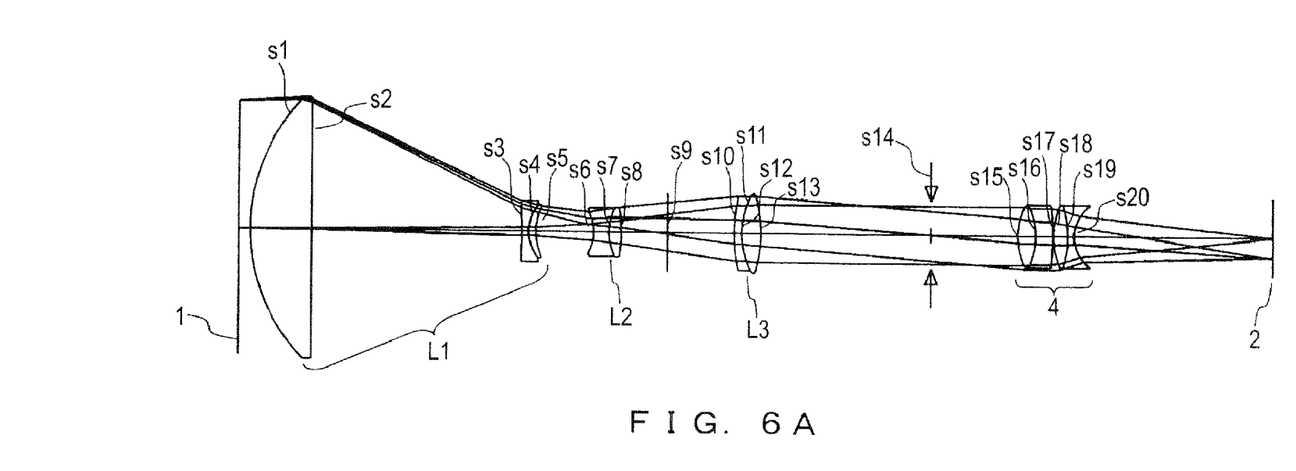
FIG. 6A is a diagram showing the surface numbers of the macro optical system and the light paths of light beams of embodiment 3.
Figure 6B:
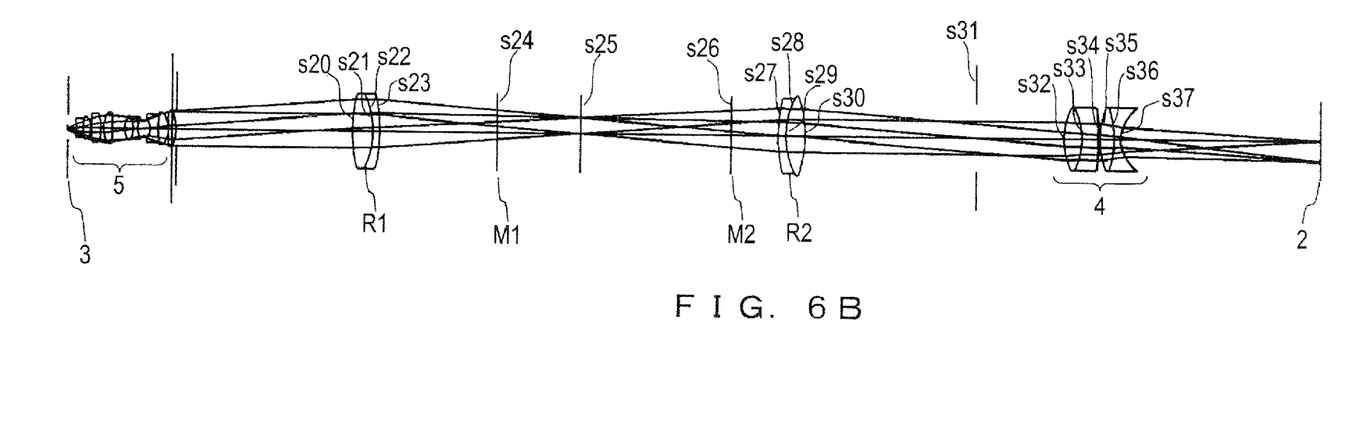
FIG. 6B is a diagram showing the surface numbers of the micro optical system and the light paths of light beams of embodiment 3.

The lens data of the optical systems used in embodiment 3 will be disclosed in the following. FIG. 6A is a diagram showing the surface numbers of the macro optical system and the light paths of light beams of the present embodiment. FIG. 6B is a diagram showing the surface numbers of the micro optical system and the light paths of light beams of the present embodiment. In regard to the micro optical system, since it is desired that the objective 5 be accordingly exchanged and used, codes are omitted in FIG. 6B. FIG. 6B illustrates light paths when using an objective with a 10-fold magnification as the objective 5.

Tables 7 and 8 shown in the following indicate lens data of the macro optical system of embodiment 3. Table 7 indicates lens data of the optical system leading from the specimen position 1 of the macro optical system to the image position 2. Table 8 indicates the focal lengths of the lens groups L1, L2 and L3 of the macro optical system and the working distance of the macro optical system.

TABLE 7

| | | Code | Surface number | Radius of curvature | Surface separation | Refractive index | Abbe number |
|---|---|---|---|---|---|---|---|
| Specimen position | | 1 | OBJ | INF | 5 | AIR | |
| Macro optical system | | L1 | s1 | 76.7 | 26.5 | 1.51633 | 64.14 |
| | | | 2 | INF | 90.357 | AIR | |
| | | | 3 | −577.302 | 3 | 1.65412 | 39.68 |
| | | | 4 | 17.655 | 3 | 1.7725 | 49.6 |
| | | | 5 | 23.101 | 25.1927 | AIR | |
| | | L2 | 6 | −17.385 | 6.55 | 1.6779 | 55.34 |
| | | | 7 | 22.637 | 5.4 | 1.738 | 32.26 |
| | | | 8 | −64.035 | 20 | AIR | |
| Mirror | | M2 | 9 | INF | 28.6506 | AIR | |
| Macro optical system | | L3 | 10 | 69.197 | 3.35 | 1.6134 | 44.27 |
| | | | 11 | 33.076 | 0.0201 | AIR | |
| | | | 12 | 33.222 | 8.2 | 1.43875 | 94.93 |
| | | | 13 | −56.329 | 73.8674 | AIR | |

TABLE 7-continued

|  | Code | Surface number | Radius of curvature | Surface separation | Refractive index | Abbe number |
|---|---|---|---|---|---|---|
| Exit pupil position | 6 | 14 | INF | 38.0765 | AIR | |
| Tube lens | 4 | 15 | 28.284 | 7.72 | 1.43875 | 94.93 |
|  |  | 16 | −28.284 | 7.25 | 1.8061 | 40.92 |
|  |  | 17 | −120.66 | 0.492 | AIR | |
|  |  | 18 | 32.615 | 6.3 | 1.834 | 37.16 |
|  |  | 19 | −41.056 | 2.81 | 1.6134 | 44.27 |
|  |  | 20 | 15.653 | 85.7256 | AIR | |
| Image plane | 2 | IMG | INF | | | |

TABLE 8

| | Focal length of lens group | Focal length of lens group | Focal length of lens group | Working distance |
|---|---|---|---|---|
| L1 | −7579.02 | −181.719 | 770.409 | 5 |
| L2 | −46.798 | | | |
| L3 | 89.985 | — | | |

The lens data above indicates that in the macro optical system of embodiment 3, the first macro optical system lens group L1 has negative refracting power; the second macro optical system lens group L2 has negative refracting power; and the third macro optical system lens group L3 has positive retracting power.

As shown or illustrated in the lens data above and the light path in FIG. 6A, the macro optical system of embodiment 3 is a telecentric optical system. In other words, although the lens aperture of the first macro optical system lens group L1 is large, the observation device of the present embodiment is effective in measuring the size of a specimen, and is effective when it is used for an observation (and illumination) in which the directivity is the first priority.

Table 9 in the following is lens data of the micro optical system of embodiment 3. The objective mounting position in Table 9 is an abutting surface between an objective and the body of a microscope when the objective is attached to the body of the microscope. The seventeenth surface (surface numbers17) to the nineteenth surface (surface numbers19) in Table 9 are virtual surfaces, each of which is used to work out a design.

TABLE 9

|  | Code | Surface number | Radius of curvature | Surface separation | Refractive index | Abbe number |
|---|---|---|---|---|---|---|
| Specimen position | 3 | OBJ | INF | 0.17 | 1.521 | 56.02 |
| Objective 10X | 5 | s1 | INF | 3.9486 | AIR | |
|  |  | 2 | −5.9965 | 2.982 | 1.673 | 38.15 |
|  |  | 3 | 71.8587 | 3.0905 | 1.497 | 81.54 |
|  |  | 4 | −7.1299 | 0.2125 | AIR | |
|  |  | 5 | 177.085 | 4.1851 | 1.56907 | 71.3 |
|  |  | 6 | −18.9259 | 1.11 | AIR | |
|  |  | 7 | 11.1707 | 3.6235 | 1.43875 | 94.93 |
|  |  | 8 | INF | 5.4744 | AIR | |
|  |  | 9 | 9.3475 | 3.6935 | 1.43875 | 94.93 |
|  |  | 10 | −10.9268 | 1.8214 | 1.55836 | 54.01 |
|  |  | 11 | 7.4855 | 5.511 | AIR | |
|  |  | 12 | −5.4188 | 3.5673 | 1.51633 | 64.14 |
|  |  | 13 | 116.2141 | 4.0903 | 1.43875 | 94.93 |
|  |  | 14 | −10.794 | 0.13 | AIR | |

TABLE 9-continued

|  | Code | Surface number | Radius of curvature | Surface separation | Refractive index | Abbe number |
|---|---|---|---|---|---|---|
|  |  | 15 | INF | 3.238 | 1.497 | 81.54 |
|  |  | 16 | −17.1112 | −1.788 | AIR | |
|  |  | 17 | INF | 2 | AIR | |
|  |  | 18 | INF | −2 | AIR | |
| Objective mounting position | | 19 | INF | 78 | AIR | |
| Pupil relay optical system | R1 | 20 | 67.434 | 8.5 | 1.48749 | 70.23 |
|  |  | 21 | −36.268 | 0.052 | AIR | |
|  |  | 22 | −35.806 | 3 | 1.738 | 32.26 |
|  |  | 23 | −65.776 | 50.338 | AIR | |
| Mirror | M1 | 24 | INF | 35.7163 | AIR | |
| Intermediate image | | 25 | INF | 64.774 | AIR | |
| Mirror | M2 | 26 | INF | 20 | AIR | |
| Pupil relay optical system | R2 | 27 | 69.197 | 3.35 | 1.6134 | 44.27 |
|  |  | 28 | 33.076 | 0.0201 | AIR | |
|  |  | 29 | 33.222 | 8.2 | 1.43875 | 94.93 |
|  |  | 30 | −56.329 | 73.8674 | AIR | |
| Pupil-conjugate position | | 31 | INF | 38.0765 | AIR | |
| Tube lens | 4 | 32 | 28.284 | 7.72 | 1.43875 | 94.93 |
|  |  | 33 | −28.284 | 7.25 | 1.8061 | 40.92 |
|  |  | 34 | −120.66 | 0.492 | AIR | |
|  |  | 35 | 32.615 | 6.3 | 1.834 | 37.16 |
|  |  | 36 | −41.056 | 2.81 | 1.6134 | 44.27 |
|  |  | 37 | 15.653 | 85.7256 | AIR | |
| Image position | 2 | IMG | INF | | | |

Embodiment 4

Figure 7:
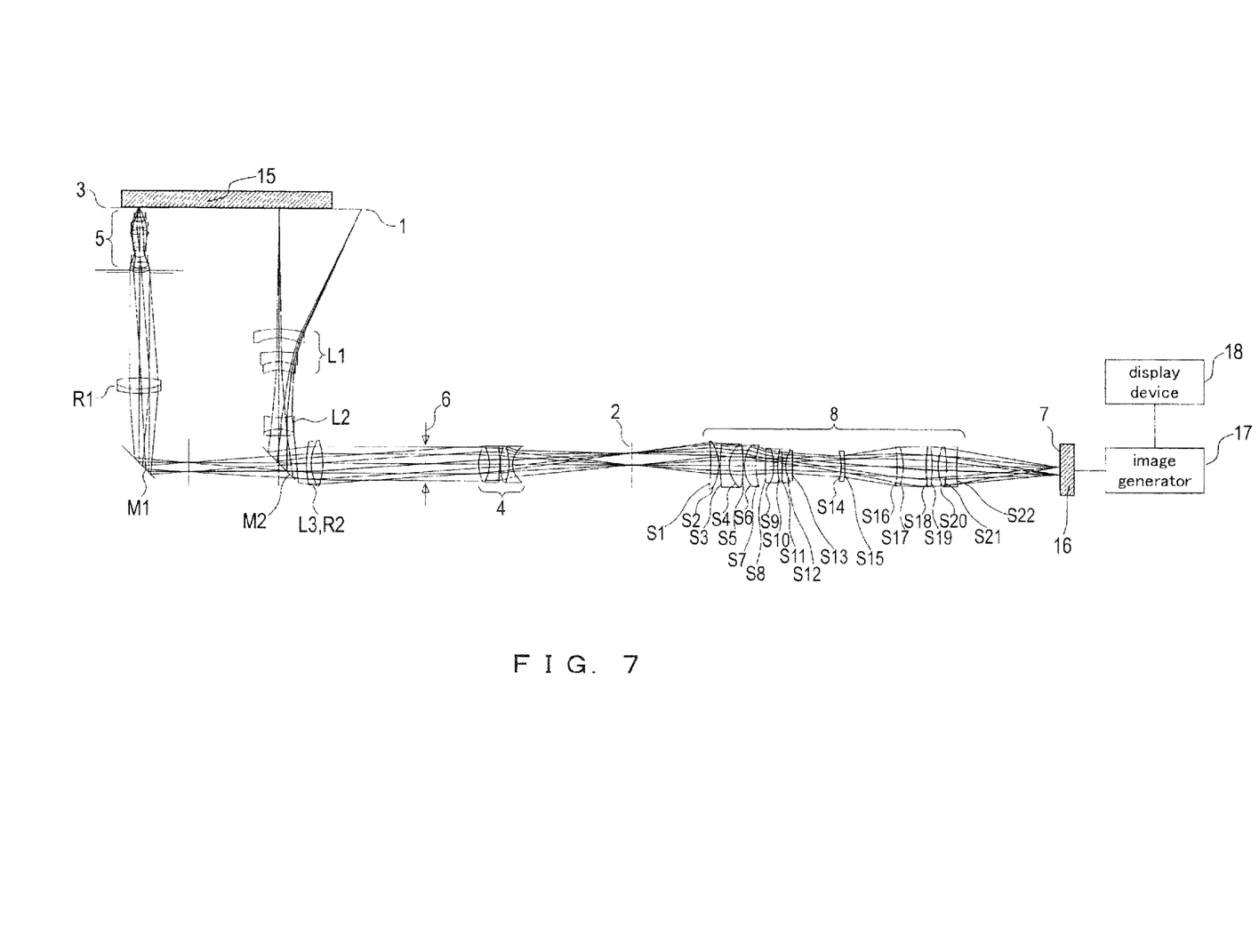
FIG. 7 is a diagram exemplifying the configuration of the observation device including the macro optical system and the micro optical system according to embodiment 4.

FIG. 7 is a diagram exemplifying the configuration of an observation device including a macro optical system and a micro optical system according to the present embodiment. The observation device illustrated in FIG. 7 is configured by adding a zoom optical system 8 to the observation device illustrated in embodiment 1. Although FIG. 7 is based on the observation device illustrated in embodiment 1, the observation device may be configured by adding a zoom optical system to the observation device illustrated in embodiment 2, 3, or the like.

FIG. 7 also illustrates a light path leading from a specimen position 1 of the macro optical system to a zoom image position 7 and a light path leading from a specimen position 3 of the micro optical system to the zoom image position 7.

As with embodiment 1, the macro and micro optical systems not only share the image position 2 but also share a pupil position 6 that is the direct pupil position of the macro optical system and that is made by relaying a pupil position of the micro optical system. The tube lens 4 placed between the pupil position 6 and the image position 2 is also shared by the macro and micro optical systems.

In the present embodiment, in addition, using a zoom optical system of a finite type as the zoom optical system 8, the image position 2 is relayed to the zoom image position 7. In this case, it is preferable that the configuration of the present embodiment be made such that the image sensor 16 such as a CCD is placed at the zoom image position 7 as illustrated in FIG. 7, and this configuration is preferably used for an electronic observation method in which an image of a specimen which the image generator 17 generates from a signal output from the image sensor 16 is shown on the display device 18.

The specimen position 1 of the macro optical system and the specimen position 3 of the micro optical system are configured on the same plane. Therefore, it is also possible to make a configuration in which the specimen position 1 of the macro optical system and the specimen position 3 of the micro optical system are switched by a rotary stage 15. The rotary stage 15 comprises both a rolling mechanism and a transferring mechanism for transferring in direction parallel to the stage surface.

The lens data of the zoom optical system used in embodiment 4 is disclosed in the following. Table 10 indicates the lens data of the zoom optical system 8. The lens data shown by table 10 is lens data in which the image position 2 is regarded as being an object surface (surface number "OBJ") and the zoom image position is regarded as being an image surface (surface number "IMG"). The surface numbers of the lens data correspond to codes S1 to S22 illustrated in FIG. 7.

TABLE 10

|  | Surface number | Radius of curvature | Surface separation | Refractive index | Abbe number |
|---|---|---|---|---|---|
|  | OBJ | INF | 56.9878 | AIR |  |
| zoom | 1 | −195.737 | 5.8 | 1.48749 | 70.23 |
| optical | 2 | −30.998 | 1 | AIR |  |
| system | 3 | 133.228 | 6.35 | 1.834 | 37.16 |
|  | 4 | 20.26 | 9.8 | 1.497 | 81.54 |
|  | 5 | −108.947 | 1 | AIR |  |
|  | 6 | 23.392 | 8.25 | 1.72916 | 54.68 |
|  | 7 | 47.795 | D1 | AIR |  |
|  | 8 | 289.274 | 5.6 | 1.738 | 32.26 |
|  | 9 | −40.355 | 3 | 1.7725 | 49.6 |
|  | 10 | 42.167 | 3.2 | AIR |  |
|  | 11 | −172.814 | 2.8 | 1.7725 | 49.6 |
|  | 12 | 22.43 | 4.5 | 1.738 | 32.26 |
|  | 13 | 267.473 | D2 | AIR |  |
|  | 14 | −38.998 | 2.8 | 1.6779 | 55.34 |
|  | 15 | −112.304 | D3 | AIR |  |
|  | 16 | −104.447 | 4.5 | 1.43875 | 94.93 |
|  | 17 | −37.846 | D4 | AIR |  |
|  | 18 | 86.418 | 4.5 | 1.43875 | 94.93 |
|  | 19 | −96.57 | D5 | AIR |  |
|  | 20 | 33.1115 | 6 | 1.43875 | 94.93 |
|  | 21 | −87.4949 | 7.4 | 1.834 | 37.16 |
|  | 22 | 146.0846 | 74.3679 | AIR |  |
|  | IMG | INF |  |  |  |

D1, D2, D3, D4 and D5 in the lens data indicate lens surface separations that change when a zoom magnification is changed.

Table 11 illustrates lens surface separations D1 to D5 above when a magnification is low, intermediate, and high.

TABLE 11

| Movable part | Low magnification | Intermediate magnification | High magnification |
|---|---|---|---|
| D1 | 7.00 | 28.117 | 36.014 |
| D2 | 35.277 | 12.258 | 3.955 |
| D3 | 37.728 | 25.687 | 7.758 |
| D4 | 16.489 | 17.083 | 6.378 |
| D5 | 4.202 | 17.553 | 46.593 |

According to the configuration of the present embodiment, a magnification can be changed not only by switching the macro optical system and the micro optical system but also by using the zoom optical system. Therefore, the observation device of the present embodiment can be used while continuously changing the magnification within a wide range.

In the configuration of the present embodiment, a zoom optical system of a finite type is used. However, the configuration of the present embodiment is not particularly limited to being such a configuration. For example, it is also possible to make a configuration in which an a focal zoom optical system is provided in the vicinity of the pupil position 6 form an image by means of the tube lens 4. In addition, it is also possible to make a configuration in which the tube lens 4 itself comprises a zoom mechanism.

Embodiment 5

Figure 8:
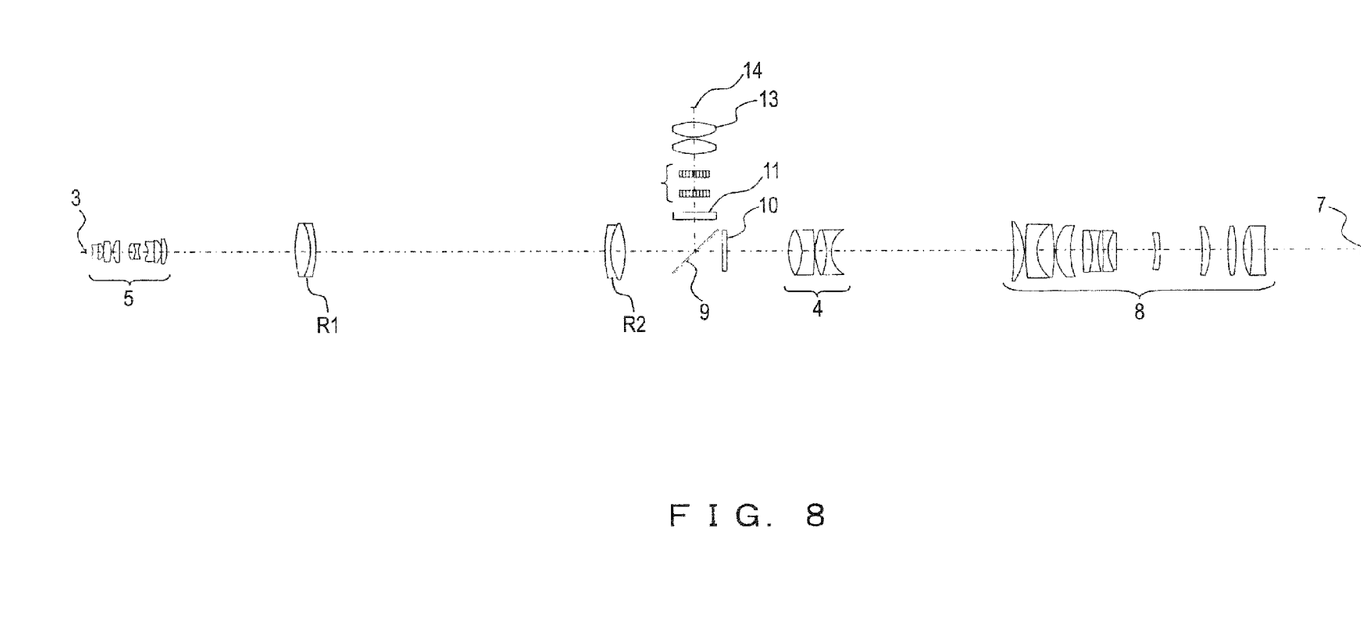
FIG. 8 is a diagram exemplifying the configuration of the observation device illustrated in FIG. 7 further comprising an epi-illumination optical system.

The present embodiment discloses the configuration of an observation device further comprising an epi-illumination optical system. FIG. 8 illustrates a configuration of the observation device according to embodiment 4 further comprising an epi-illumination optical system. A macro optical system is omitted in FIG. 8.

As shown in FIG. 8, the micro optical system of the observation device of the present embodiment comprises an objective 5, a first relay optical system lens group R1, a second pupil relay optical system lens group R2, a tube lens 4, and a zoom optical system 8, all of which are placed in this order in an area leading from the specimen position 3 to the zoom image position 7. The light path of the macro optical system (not shown) is coupled with the light path of the micro optical system by providing a light path dividing element (second light path dividing element) between the first pupil relay optical system lens group R1 and the second pupil relay optical system lens group R2.

The observation device of the present embodiment makes the epi-illumination optical system insert illumination light from between the second pupil relay optical system lens group R2 and the tube lens 4. In other words, the illumination light from the epi-illumination optical system is inserted in the vicinity of a pupil position 6 (not shown) that is shared by the macro and micro optical systems.

In general, a light flux diameter also including an off-axis light beam is the smallest at a pupil position. Therefore, the configuration in which an illumination light path and an observation light path are branched in the vicinity of the pupil position 6 (not shown) shared by the macro and micro optical systems is an efficient configuration, which can reduce occurrences of vignetting most.

In the present embodiment, the light paths above are branched by a so-called fluorescence cube. In other words, the fluorescence cube is a unit made by combining a dichroic mirror 9, an absorption filter 10, and an excitation filter 11, which are placed in such a way that they can be exchanged on a unit-by-unit basis.

The dichroic mirror 9 separates observation light that is fluorescence from illumination light that is excitation light. A light beam having desired wavelengths from among the light beams transmitted through the dichroic mirror 9 is selectively transmitted through the absorption filter 10. The light from illumination light, which has wavelengths that can be used as excitation light, is selectively transmitted through the excitation filter 11.

The present embodiment illustrates a configuration in which fluorescence observation using epi-illumination is assumed. In accordance with an observation method, instead of using a fluorescence cube, a half mirror or the like may be used as a means for branching an Illumination light path and an observation light path.

The present embodiment, illustrates a configuration in which fly-eye lenses 12 are used in the epi-illumination optical system. In more detail, the epi-illumination optical system comprises the fly-eye lenses 12, a collector lens 13, and a light source 14. The illumination light emitted from the light source 14 is converted into a substantially parallel light flux by the collector lens 13. The substantially parallel light flux is then incident on the fly-eye lenses 12. The fly-eye lenses 12 are configured such that the incident parallel light fluxes are focused in the vicinity of the light exit end of the fly-eye lenses 12. Therefore, images of the light source 14 of the same number as the number of lens elements comprised in the fly-eye lenses 12 are projected in the vicinity of the light exit end of the fly-eye lenses 12.

In the present embodiment, in addition, the light exit end of the fly-eye lenses 12 is placed adjacent to the excitation filter 11. The excitation filter 11 is placed at or in the vicinity of the pupil position 6 shared by the macro and micro optical systems. Such a configuration can achieve Koehler illumination, for which the fly-eye lenses 12 are used, and a light path separation that reduces occurrences of vignetting.

What is claimed is:

1. An observation device, comprising:
   a micro optical system; and
   a macro optical system, wherein:
   the micro and macro optical systems share an image position; and
   a first pupil position of the micro optical system and a second pupil position of the macro optical system substantially coincide with one another.

2. The observation device according to claim 1, wherein the micro optical system includes:
   an objective; and
   a pupil relay optical system for relaying a pupil of the objective, wherein:
   the objective and the pupil relay optical system are arranged in this order starting from an object side; and
   the first pupil position is a position of a pupil formed by relaying the pupil of the objective by means of the pupil relay optical system.

3. The observation device according to claim 2, wherein:
   the macro optical system includes three groups between the object and the second pupil position; and
   the three groups include:
      a first macro optical system lens group that has a negative refracting power;
      a second macro optical system lens group that has a negative refracting power; and
      a third macro optical system lens group that has a positive refracting power, and wherein
   the first, second, and third macro optical system lens groups are arranged in this order starting from the object side.

4. The observation device according to claim 3, wherein the first and second macro optical system lens groups are arranged in such a way that concave surfaces of the first and second macro optical system lens groups face each other.

5. The observation device according to claim 2, wherein:
   the pupil relay optical system is configured to include two groups; and
   the two groups include:
      a first pupil relay optical system lens group that has a positive refracting power; and
      a second pupil relay optical system lens group that has a positive refracting power, and wherein:
   the first and second pupil relay optical system lens groups are arranged in this order starting from, the object side; and
   a primary image is formed between the first and second pupil relay optical system lens groups.

6. The observation device according to claim 2, wherein:
   the macro optical system includes three groups between the object and the second pupil position; and
   the three groups include:
      a first macro optical system lens group that has a negative refracting power;
      a second macro optical system lens group that has a negative refracting power; and
      a third macro optical system, lens group that has a positive refracting power, wherein:
   the first, second, and third macro optical system lens groups are arranged in this order starting from the object side;
   the pupil relay optical system is configured to include two groups; and
   the two groups include:
      a first pupil relay optical system lens group that has a positive refracting power; and
      a second pupil relay optical system lens group that has a positive refracting power, and wherein:
   the first and second pupil relay optical lens groups are arranged in this order starting from the object side; and
   a primary image is formed between the first and second pupil relay optical system lens groups.

7. The observation device according to claim 6, wherein the third macro optical system lens group and the second pupil relay optical system lens group are lens groups that have a same design.

8. The observation device according to claim 7, wherein the third macro optical system lens group is the second pupil relay optical system lens group.

9. The observation device according to claim 6, further comprising
   a first light path dividing element for dividing a light path of the macro optical system from a light, path of the micro optical system, wherein
   the first light path dividing element is placed between the first and second pupil relay optical system lens groups.

10. The observation device according to claim 9, further comprising
    a tube lens between the first light path dividing element and the image position.

11. The observation device according to claim 10, further comprising
    an illumination optical system for illuminating the object; and
    a second light path dividing element for dividing a light path of a light beam from the illumination optical system from a light path of a light beam from the object, wherein
    the second light path dividing element is placed between the first light path dividing element and the tube lens.

12. The observation device according to claim 11, wherein the second light path dividing element includes:
    a dichroic mirror;
    an excitation filter; and
    an absorption filter, and wherein
    the excitation filter is placed at a position that substantially coincides with the first pupil position.

13. The observation device according to claim 12, wherein:
    the illumination optical system includes a fly-eye lens; and
    the fly-eye lens is placed adjacent to the excitation filter.

14. The observation device according to claim 2, further comprising
    an image sensor placed at the image position.

15. The observation device according to claim 2, further comprising:
    a zoom optical system for relaying the image position; and
    an image sensor, wherein
    the image sensor is placed at a position to which the image position is relayed by the zoom optical system.

16. The observation device according to claim 2, further comprising
    a rotary stage, wherein:
    a focal plane of the micro optical system and a focal plane of the macro optical system are formed on a same plane; and
    a specimen is moved between the micro and macro optical systems by the rotary stage.

* * * * *